United States Patent [19]

Smith et al.

[11] Patent Number: 4,929,222
[45] Date of Patent: May 29, 1990

[54] CONNECTABLE BELT AND METHOD FOR FORMING SAME

[75] Inventors: Thomas R. Smith; Thomas M. Tripp, both of Newton, Iowa

[73] Assignee: Pyramid, Inc., Newton, Iowa

[21] Appl. No.: 402,557

[22] Filed: Sep. 5, 1989

[51] Int. Cl.$^5$ .............................................. F16G 3/00
[52] U.S. Cl. ................................ 474/255; 24/230.5 R; 156/137
[58] Field of Search ..................... 474/253–259; 24/31 R, 31 H, 31 F, 230.5 R, 231, 265 H; 156/137, 157–159

[56] References Cited

U.S. PATENT DOCUMENTS

| | | | |
|---|---|---|---|
| 383,208 | 5/1888 | Binns | 474/255 |
| 2,109,717 | 3/1936 | Arnold | 474/255 X |
| 3,631,733 | 1/1972 | Thompson, Jr. | 474/255 |
| 3,820,195 | 6/1974 | Hutzell | 17/44.2 |
| 3,841,168 | 10/1974 | Daniels | 474/252 |
| 4,135,693 | 1/1979 | Miavitz | 248/339 |
| 4,363,509 | 12/1982 | Schreyer | 24/230.5 R |
| 4,392,281 | 7/1983 | Metz et al. | 24/230.5 R |
| 4,404,712 | 9/1983 | Northe et al. | 24/129 |
| 4,650,446 | 3/1987 | Pinto et al. | 474/253 |
| 4,681,646 | 7/1987 | Pinto et al. | 156/157 |
| 4,781,666 | 11/1988 | Acee, Sr. | 474/253 |
| 4,795,410 | 1/1989 | Alderfer | 474/256 |

Primary Examiner—Thuy M. Bui
Attorney, Agent, or Firm—Zarley, McKee, Thomte, Voorhees & Sease

[57] ABSTRACT

The connectable drive belt of the present invention includes an elongated circular cord formed from an elastomeric material. The ends of the cord are flattened and formed into a portion having a rectangular cross-section. A hole is formed in the end of each flattened portion. Then a metal clip having two hooks lying in planes perpendicular to one another is used to connect the opposite ends of the belt together. Once connected, the flattened ends of the belt are twisted 90 degrees relative to one another and are held in this position by the clip.

8 Claims, 3 Drawing Sheets

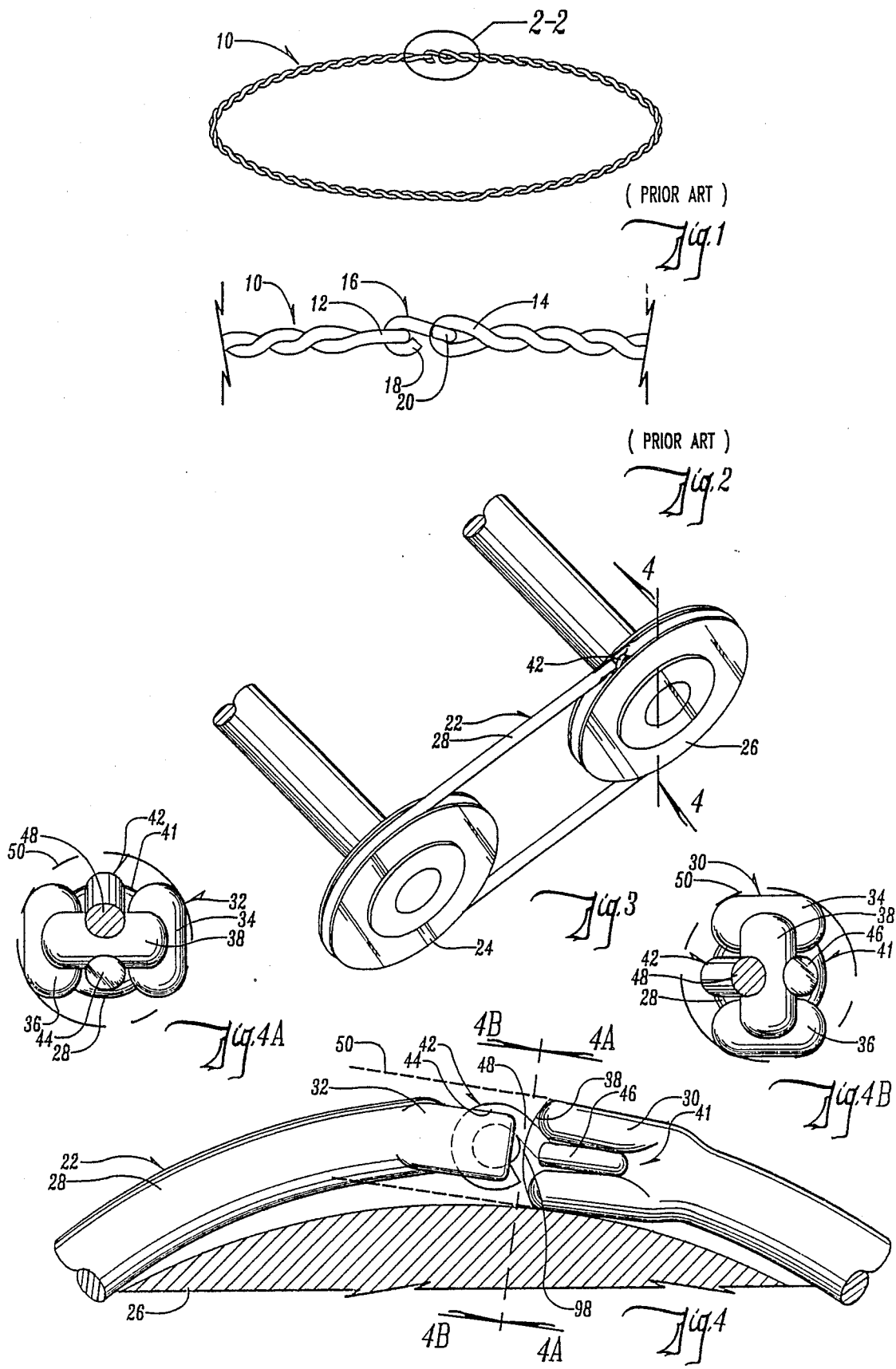

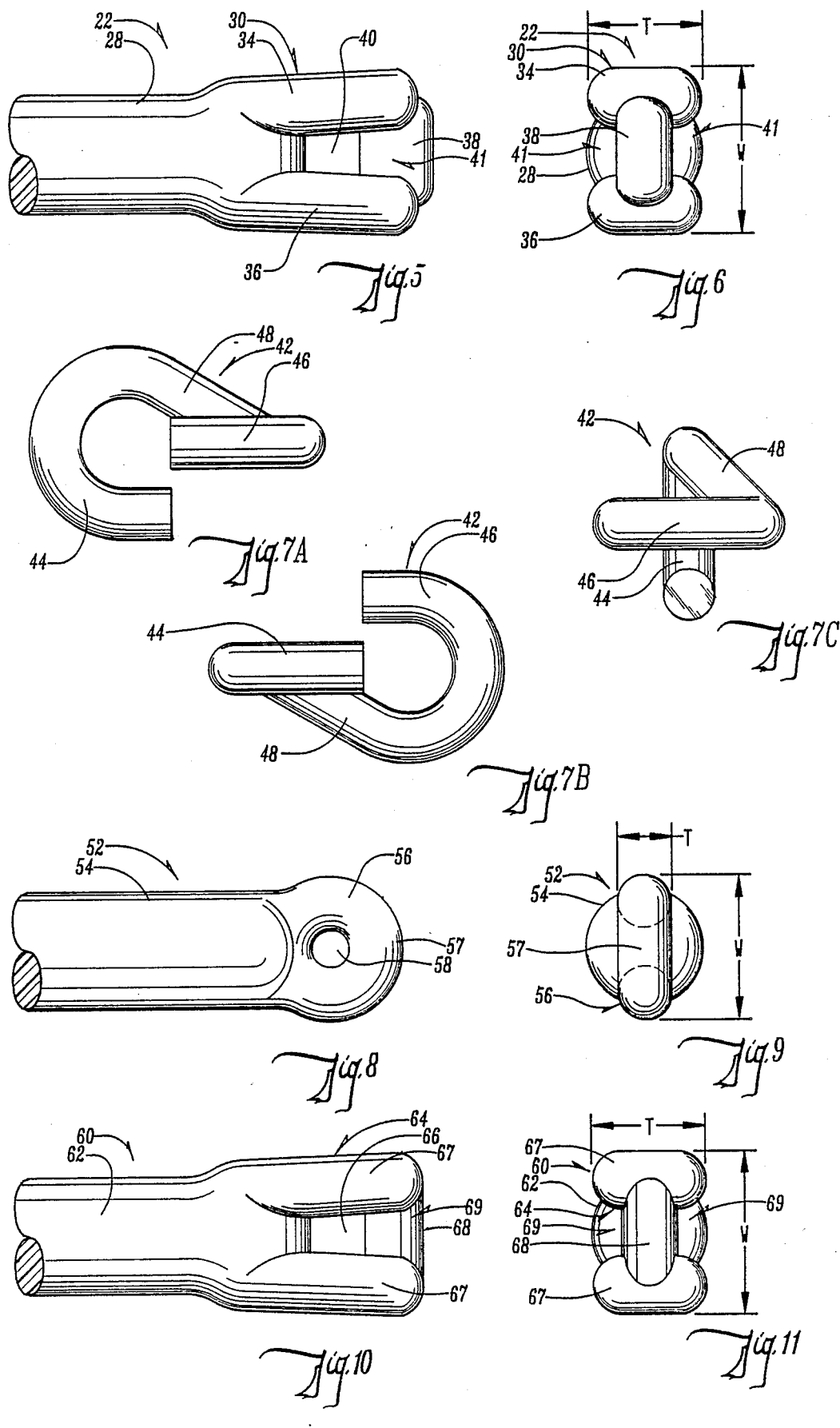

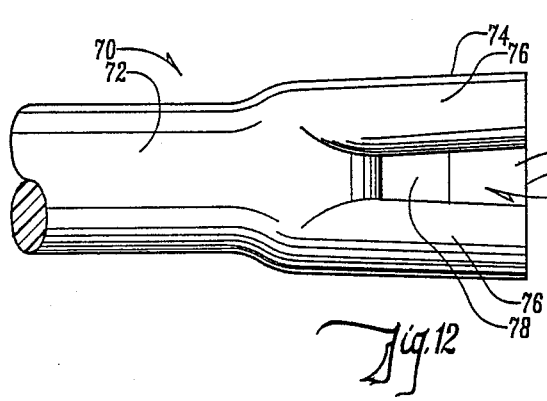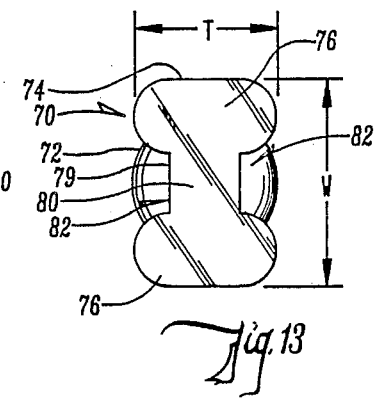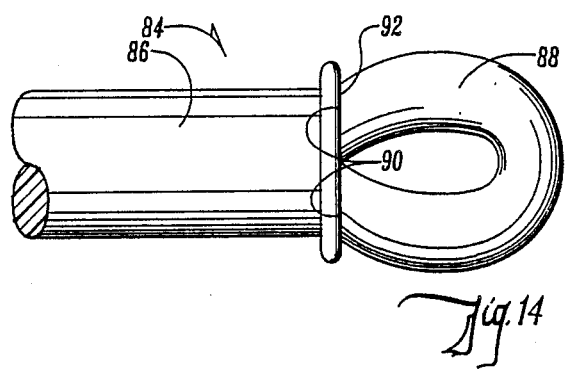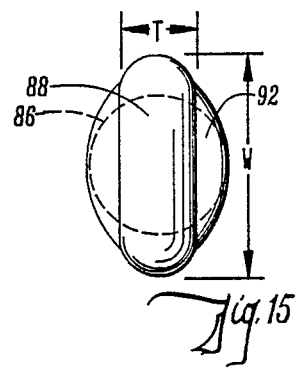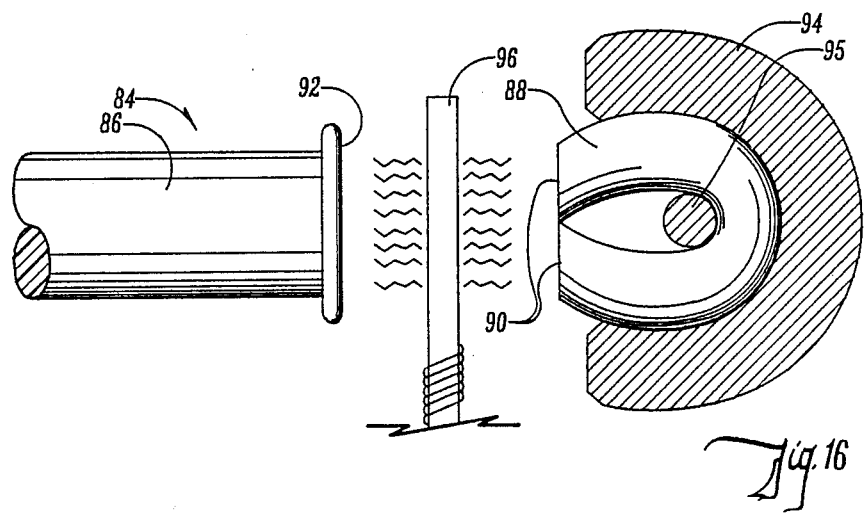

CONNECTABLE BELT AND METHOD FOR FORMING SAME

BACKGROUND OF THE INVENTION

The present invention relates to a connectable belt and method for forming same.

Flexible drive belts are used in many different types of equipment and machinery. Usually these belts are trained around a pair of pulleys. In most applications, the belts can be continuous belts, but in certain applications it is necessary to have a connectable belt which can first be threaded through a series of pulleys and then connected together to form a continuous belt.

One form of prior art connectable belt is shown in FIGS. 1 and 2. The belt includes a double thickness strand of flexible material which is twisted into the configuration shown in FIGS. 1 and 2. The twisted belt includes loops 12 and 14 at its opposite ends. The loops 12 and 14 are connected by a metal clip 16 having a first hook-shaped portion 18 and a second hook-shaped portion 20. Hook 18 is oriented in a vertical plane, whereas hook 20 is oriented in a horizontal plane. The hooks 18 and 20 are fitted within the loops 12 and 14 respectively so as to connect the two ends together. After the hooks have been inserted into the loops 12 and 14, the hook is crimped downwardly so that it tightly grasps the end of loops 12 and 14.

Several disadvantages have been encountered with the prior art belts, such as shown in FIGS. 1 and 2. These belts are difficult to replace because it is difficult to determine the correct length for the belt in order to achieve the desired tension. The twisting of the belt alters the tension characteristics of the belt, and it is therefore very difficult to ascertain the proper length for the belt in order to achieve the proper tension.

Therefore, a primary object of the present invention is the provision of an improved connectable belt and method for forming same.

A further object of the present invention is the provision of an improved connectable belt which can be easily manufactured.

A further object of the present invention is the provision of an improved connectable belt which has an easily predictable tension for any given length.

A further object of the present invention is the provision of an improved connectable belt which can be sized easily to replace previous belts while at the same time exhibiting the same amount of tension achieved in previous belts.

A further object of the present invention is the provision of a connectable belt which protects the connecting clip from engagement from any drive pulleys around which the belt is strained.

A further object of the present invention is the provision of a connectable belt and method for using same which minimizes the wear between the connecting clip and the ends of the belt.

A further object of the present invention is the provision of a connectable belt having a central portion of round cross section and having ends which are flattened by the application of heat and pressure.

A further object of the present invention is the provision of an improved connectable belt and method for forming same, wherein the belt includes a central portion of circular cross section and flattened ends which are of different cross section, but which have approximately the same cross-sectional area as the circular center portion.

A further object of the present invention is the provision of a connectable belt and method for forming same, wherein the belt has consistent elasticity along its entire length, including the flattened end portions.

A further object of the present invention is the provision of a connectable belt which is economical to manufacture, durable in use, and efficient in operation.

SUMMARY OF THE INVENTION

The present invention is for a drive belt made of an elastomer which has substantially a round cross-section. The method for constructing the belt comprises cutting the elastomer cord to the proper length and forming the ends of the cord with heat and pressure into a flattened configuration having a hole extending transversely therethrough. The flattened ends are then connected by means of a clip having two hook portions disposed at 90 degree angles with respect to one another. The use of this clip causes the flattened end portions of the belt also to be disposed at a 90 degree angle with respect to one another. After the clip has been inserted into the holes in the ends of the belt, the hook portions of the clip are crimped downwardly so that they tightly grasp the ends of the belt. This prevents relative movement between the belt and the connecting link and results in less wear to the belt than would occur if the hook portions are permitted to move relative to the belt.

The advantage of this construction is to be able to use an elastomer belt in equipment where a continuous belt cannot be used. The 90 degree twist in the connecting clip and the shapes of the ends of the belt protect the connecting clip from abrasion against the drive or driven pulleys. The crimping of the clip to prevent relative motion between the clip and the belt eliminates or reduces wear, and thereby gives a much longer life in operation to the belt than would be obtained if the loops were left open so that slippage could occur between the clip and the belt The ends of the belt can be formed to receive a connecting link either by heating the ends and inserting them into a forming mold or by forming the end pieces independently of the belt by injection molding and heat welding them to the ends of the belt. The main body of the belt can have a cross-section which is round, octagonal, hexagonal, or even shaped to operate as a V belt. The preferred shape would be round.

One modified form of the invention utilizes a drive belt made of an elastomer which has a substantially round cross-section. Then a short section of smaller cross-section than the main portion of the belt is formed into a loop and is connected to the end of the belt by heat welding. This smaller section of material then forms a loop which will receive a connecting link in the above-described manner.

BRIEF DESCRIPTION OF THE DRAWINGS

FIG. 1 is a perspective view of a prior art twisted belt.

FIG. 2 is an enlarged detailed view taken along line 2—2 of FIG. 1.

FIG. 3 is a perspective view of a belt of the present invention mounted on a pair of pulleys.

FIG. 4 is an enlarged sectional view taken along line 4—4 of FIG. 3.

FIGS. 4A and 4B are sectional views taken along lines 4A—4A and 4B—4B of FIG. 4.

FIG. 5 is an enlarged detailed plan view of the formed end of the belt shown in FIGS. 3 and 4.

FIG. 6 is an end view of the device shown in FIG. 5.

FIGS. 7a, 7b, and 7c are front elevational, end elevational, and plan views respectively of the clip used with the present invention.

FIGS. 8 and 9 are detailed views of a belt showing a modified shape thereof.

FIGS. 10 and 11 illustrate a further modified shape which can be used for the ends of the belt.

FIGS. 12 and 13 show a further modified shape which can be used for the ends of the belt.

FIGS. 14 and 15 show still a further modified form which can be used for the end of the belt.

FIG. 16 shows the method for connecting the loop and the end of the belt shown in FIG. 14.

DESCRIPTION OF THE PREFERRED EMBODIMENT

Referring to FIGS. 3-6, a connectable belt 22 is shown trained around a first pulley 24 and a second pulley 26. Belt 22 comprises an elongated center portion 28 which is round in crosssection. Belt 28 includes a flattened end 30 and an opposite end 32. The flattened ends are formed by the application of heat and pressure to the elastomeric belt. The belt is preferably made of an elastomer which is thermoplastic and which is capable of being formed in response to the application of heat and pressure. It is also elastic so that it can be stretched to provide the appropriate tension around pulleys 24, 26.

The flattened ends of the belt 22 are shown in FIGS. 5 and 6. They include a pair of rounded side ribs 34, 36 and a rounded end protrusion 38 extending axially from the end of the belt. A hole 40 is formed in the ends of the belt and extends transversely therethrough. Ribs 34, 36 form a pair elongated grooves 41 which are on opposite sides of end portions 30, 32, and which are positioned between ribs 34, 36.

A clip 42 is used to connect the two ends of the belt together. Clip 42 comprises a first hook portion 44 and a second hook portion 46 which are interconnected by means of an angled center portion or shank 48. Hook portion 44 lies in a vertical plane, and hook portion 46 lies in a horizontal plane oriented 90 degrees relative to the plane of hook portion 44.

Referring to FIG. 4, the clip 42 is used to interconnect the two opposite ends of the belt 22. Hook portion 44 is inserted through the end portion 32, and hook portion 46 is inserted through the hole 40 in the flattened end portion 30. The fact that hook portions 44, 46 are twisted 90 degrees with respect to one another also causes the flattened portions 30, 32 to be oriented 90 degrees relative to one another. As can be seen in FIG. 6, the flattened end portions each include a thickness T and a width W. The width W is greater than the thickness T so that each end portion is approximately rectangular in cross-section. However, since the end portions are formed by heat and pressure from the original round belt 22, the cross-sectional areas of the round portion 28 and the end portions 30, 32 are approximately the same. This is important because the elastic characteristics of the belt remain substantially the same along its entire length, including the center portion 28 and the end portions 30, 32.

The ribs 34, 36 of each end portion 30, 32 define a cylindrical boundary which is designated in FIG. 4 by the line 50. As can be seen in FIGS. 4a and 4b, this cylindrical boundary 50 extends radially outwardly from the clip 42. Thus the ribs 34, 36 of end portions 30, 32 protect the clip against engagement with the pulley 26, thereby reducing the wear to the clip and to the belt itself.

When it becomes necessary to replace the belt 22, all that is necessary is to cut a new elastomeric cord of circular cross section to the desired length. Then the ends are heat formed to create the configurations shown in FIGS. 5 and 6. Then the clip 42 is used to connect the two together, and the original belt has been reproduced not only in length, but also in its tension and elasticity characteristics. This is to be contrasted with the prior art belt shown in FIGS. 1 and 2 which is difficult to reproduce since the twisting of the belt affects the tension and elasticity characteristics for any given length of belt. Thus, it is difficult to determine the proper length for the belt 10 while at the same time achieving the desired tension.

Referring to FIGS. 8 and 9, a modified form designated by the numeral 52 is shown for the ends of the belt. The belt 52 includes a central portion 54 which is round in cross section and a flattened end 56 which is formed by heat and pressure. End 56 is donut shaped including a circular rib 57 having a hole 58 therein. As can be seen in FIG. 9, the flattened end 56 has a thickness T and a width W which is substantially greater than the thickness.

Referring to FIGS. 10 and 11, a modified form 60 of the invention is shown. Belt 60 includes a central portion 62 which is round in cross-section and includes a flattened end 64 which is formed by heat and pressure. End 64 includes a hole 66 and a pair of spaced apart ribs 67 which form an elongated groove 69 on opposite sides of hole 66. The distal end of the belt 68 is flat or blunt, but is formed by a rib which is round in cross-section as can be seen in FIGS. 10 and 11.

FIGS. 12 and 13 show a modified form of the invention designated generally by the numeral 70. Belt 70 includes a central portion 72 which is round in cross-section and includes a flattened end 74 which is formed by heat and pressure. End 74 includes two spaced apart ribs 76 having a hole 78 therebetween. An end rib 79 joins the ends of ribs 76. The distal end 80 of device 72 is planar in configuration, as though it had been sheared off by a knife. On opposite sides of rib 79 are a pair of elongated recessed grooves 82 for receiving the hook portions of the clip 42.

Referring to FIGS. 14 and 15, a modified form of the invention is shown and is designated by the numeral 84. Belt 84 includes an elongated belt or cord 86 which is of round crosssection. A loop 88 is formed of a smaller cord having a diameter substantially less than the diameter of cord 86. Loop 88 includes opposite ends 90 which are heat sealed against the flattened end 92 of cord 86 as shown in FIG. 14.

The method for assembling loop 88 to cord 86 is shown in FIG. 15. An exterior jig 94 and an interior jig 95 are used to hold loop 88 in its horseshoe-shaped configuration with ends 90 positioned in facing relationship toward the end 92 of cord 86. A heated platen 96 is positioned between the ends 90 of loop 88 and the end 92 of cord 86. The ends 90 are then placed adjacent to or in contact with the platen 96, and at the same time the end 92 is also placed adjacent to or in contact with platen 96, resulting in the melting of the elastomeric plastic of cord 96 and cord 88. The platen 96 is then removed, and the loop 88 is joined to the cord 86 with the molten material curing and joining the two together as one in the configuration shown in FIG. 14. The cross-section of loop 88 is approximately two-thirds the diameter of the cross-section of cord 86. In one example, the rounded cross-section of cord 86 is three-sixteenths of an inch, and the rounded cross-section of the loop is approximately oneeighth of an inch. All of the configurations shown in the drawings are joined together by means of the clip 42, with hook 46 being placed through the eye or hole of one end, and with hook 44 being placed through the eye or hole of the other end of the cord. After the hooks have been placed through the holes of the cords, the clips are crimped down by pliers or other suitable tools so that they tightly embrace the elastomeric material at the ends of the cord. Because of the elongated generally rectangular cross-sectional shape of the flattened ends of all of the above configurations, the clip is protected against engagement with the pulleys around which the belt is trained in the same manner as is illustrated in FIG. 4, with the cylindrical boundary defined by the widths of the flattened ends being located radially outwardly from the outer radial edges of the clip 42. Because the clip is crimped tightly against the ends of the belts, there is no relative motion between the belts and the clips, and therefore, the device will wear longer thereby giving a longer life to the belt then would be obtained if the loops of the clip were left open so that slippage could occur. The configurations shown in FIGS. 5, 8, and 14 all include rounded axial ends which are capable of engaging one another when clipped together so as to form a rounded joining surface and thereby permit the ends of the belt to pass around the pulleys more easily. FIG. 4 illustrates how these rounded surfaces join at the point indicated by the numeral 98.

The grooves 41, 69, 82 shown in FIGS. 5, 10, and 12 provide a means for receiving the clip so that the clip will be partially protected by the rounded ribs on each side of the groove.

The use of a belt having a circular cross-section makes possible the easy replacement of previous worn out belts. The same tension and flexibility of the previous belt can be achieved by cutting the new belt to the desired length, then forming the flattened ends and joining them with a clip. In contrast, the prior twisted devices such as shown in FIGS. 1 and 2 were difficult to replace because it was difficult to recreate a belt having the same flexibility and tension as the belt being replaced. Thus, it can be seen that the device accomplishes at least all of its stated objectives.

We claim:

1. A connectable drive belt comprising:
    an elongated thermoplastic elastomer member having a central portion, a first end portion, and a second end portion, said central portion being circular in cross section and having a constant diameter along its length;
    said first end portion having a cross-sectional first thickness and a cross-sectional first width of greater dimension than said first thickness;
    said second end portion having a cross-sectional second thickness and a cross-sectional second width of greater dimension than said second thickness;
    said cross-sectional first and second widths of said first and second end portions each being of a dimension at least as great as said diameter of said central portion;
    said first and second end portions having a first hole and a second hole respectively extending therethrough in a direction perpendicular to said first and second crosssectional widths respectively;
    clip means having a first loop extending through said first hole and a second loop extending through said second hole so as to retentively grasp said first and second end portions to join said first and second end portions together;
    said first and second widths of said first and second end portions defining a cylindrical boundary;
    said entire clip means being located within and spaced radially inwardly from said cylindrical boundary.

2. A drive belt according to claim 1 wherein said clip means holds said first and second end portions in a position relative to one another wherein said first and second widths are approximately perpendicular to one another.

3. A drive belt according to claim 1 wherein said first and second ends are integral with said central portion and have been formed into flattened shapes by the application of heat and pressure.

4. A drive belt according to claim 1 wherein said first and second end portions each comprise a loop having first and second loop ends joined to said central portion.

5. A drive belt according to claim 4 wherein said loops of said first and second ends are formed of a thermoplastic elastomer and are heat welded to said central portion which is also formed of a thermoplastic elastomer.

6. A method for forming a continuous belt comprising:
    forming an elongated thermoplastic member having a central portion, a first end portion, and a second end portion, said central portion being circular in cross-section and having a constant diameter along its length, said first end portion having a cross-sectional first thickness and a crosssectional first width of greater dimension than said first thickness, said second end portion having a cross-sectional second thickness and a cross-sectional width of greater dimension than said second thickness, said cross-sectional first and second widths of said first and second end portions each being of a dimension at least as great as said diameter of said central portion, said first and second end portions having a first hole and a second hole respectively extending therethrough in a direction perpendicular to said first and second cross-sectional widths respectively;
    extending a first loop of a clip means through said first hole of said first end;
    extending a second loop of said clip means through said second holes of said second ends;
    crimping said first and second loops of said clip means into retentive engagement with said first and second end portions respectively so as to hold said first and second ends together with said first and second cross-sectional widths thereof defining a cylindrical boundary, whereby said entire clip means is located within and spaced radially inwardly from said cylindrical boundary.

7. A method according to claim 6 comprising forming said first and second end portions by the application of heat and pressure so as to flatten said end portions.

8. A method according to claim 6 comprising forming each said first and second end portions into a loop and attaching said loops to said central portion by heat welding.

* * * * *